(12) United States Patent
Gehrke et al.

(10) Patent No.: US 7,802,427 B2
(45) Date of Patent: Sep. 28, 2010

(54) SYSTEM AND METHOD FOR MONITORING BOOST LEAK

(75) Inventors: Christopher Ronald Gehrke, Chillicothe, IL (US); Michael Paul Withrow, Peoria, IL (US); James Harris Mutti, Jr., East Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 1136 days.

(21) Appl. No.: 11/436,615

(22) Filed: May 19, 2006

(65) Prior Publication Data

US 2007/0266706 A1   Nov. 22, 2007

(51) Int. Cl.
*F02D 23/00* (2006.01)

(52) U.S. Cl. .................. 60/602; 60/605.2; 123/564; 123/568.16

(58) Field of Classification Search .................. 60/602, 60/605.1, 605.2; 123/564, 568.16
See application file for complete search history.

(56) References Cited

U.S. PATENT DOCUMENTS

| | | | |
|---|---|---|---|
| 5,526,266 | A | 6/1996 | Rutan et al. |
| 6,298,718 | B1 | 10/2001 | Wang |
| 6,698,203 | B2 | 3/2004 | Wang |
| 6,725,847 | B2 * | 4/2004 | Brunemann et al. .... 123/568.12 |
| 6,732,522 | B2 | 5/2004 | Wright et al. |
| 6,804,601 | B2 * | 10/2004 | Wang et al. ............... 701/107 |
| 6,917,873 | B2 * | 7/2005 | Itoyama ..................... 701/108 |
| 7,007,472 | B2 * | 3/2006 | Baize et al. ................. 60/602 |
| 7,100,375 | B2 * | 9/2006 | Baize et al. ................. 60/602 |
| 2004/0194465 | A1 | 10/2004 | Bolz et al. |
| 2005/0000216 | A1 | 1/2005 | Bleile et al. |
| 2005/0103013 | A1 | 5/2005 | Brookshire et al. |

FOREIGN PATENT DOCUMENTS

| | | |
|---|---|---|
| EP | 1323912 A1 | 7/2003 |
| EP | 1 475 524 A1 | 11/2004 |
| EP | 1 505 283 A1 | 2/2005 |
| JP | 2000-345851 | 12/2000 |
| JP | 2000-345852 | 12/2000 |
| JP | 2000-356162 | 12/2000 |
| WO | WO 2004/090305 A1 | 10/2004 |

OTHER PUBLICATIONS

PCT International Search Report; PCT/US2007/007046; International Filing Date: Mar. 21, 2007; Applicant File Ref.: 05-817; 08350.5817-00.

* cited by examiner

*Primary Examiner*—Hoang M Nguyen
(74) *Attorney, Agent, or Firm*—Finnegan, Henderson, Farabow, Garrett & Dunner LLC

(57) ABSTRACT

An engine system is disclosed that monitors for boost leak. The system has an engine, a compressor located upstream of the engine, at least one auxiliary flow device located downstream of the engine, and a computing system operable to determine an estimated value corresponding to a flow of fluid through the compressor. The estimated value takes into account a flow of fluid from the compressor toward the at least one auxiliary flow device distinct from a flow from the compressor toward the engine.

21 Claims, 4 Drawing Sheets

US 7,802,427 B2

SYSTEM AND METHOD FOR MONITORING BOOST LEAK

TECHNICAL FIELD

The present disclosure relates generally to turbocharger diagnostic systems, and more particularly, to systems and methods for monitoring boost leak associated with a compressor of a turbocharger.

BACKGROUND

Turbochargers for diesel and gasoline engines are well known. It has been found that under certain operating conditions, the use of a turbocharger improves overall engine efficiency and provides increased power. However, when the turbocharger is not functioning properly, turbine efficiency may be lowered, the engine may operate in an unstable manner and, in extreme cases, engine damage may result. Engine designers have therefore been particularly interested in closely monitoring the operation of the turbocharger in an effort to identify problems before they impact engine performance. A boost pressure leak is one such problem in a turbocharged engine.

A turbocharger may typically have one or more pairs of turbines and compressors. The turbines are driven by engine exhaust gas and they, in turn, drive one or more compressors in order to increase the pressure of intake air provided to the engine. The amount of pressure above normal atmospheric pressure that the compressor of the turbocharger generates may typically be referred to as "boost." Loss of boost pressure in a turbocharged engine may typically be referred to as a boost leak. A turbocharger configured to electronically control the compressor to maintain a desired intake manifold pressure will respond to a boost leak by increasing the turbospeed. Because high turbospeed can cause failure of the turbocharger, the consequences of a boost leak may prove catastrophic for the turbocharger.

It is known to evaluate boost pressure using sensors indicative of the pressure of air entering a turbocharger compressor inlet. One such example is U.S. Pat. No. 6,698,203 (the '203 patent) issued to Wang on Mar. 2, 2004. The '203 patent discloses a system for estimating absolute boost pressure in a turbocharged internal combustion engine using the temperature and pressure of air entering the turbocharger compressor, the rotational speed of the turbine, and the rotational speed of the engine.

Although the system of the '203 patent may provide a method for estimating the absolute boost pressure using known or calculated values, the system does not take into account an engine system having auxiliary components or devices that receive a portion of the compressed air from the compressor. Thus, the system of the '203 patent only takes into account compressed air flowing to the intake manifold and not compressed air flowing to auxiliary components or devices, thereby resulting in less accurate calculations. These less accurate calculations may put the engine and turbocharger systems at risk of damage.

The disclosed system is directed to overcoming one or more of the problems set forth above.

SUMMARY OF THE INVENTION

In one aspect, the present disclosure is directed to an engine system that monitors for boost leak. The system includes an engine, a compressor located upstream of the engine, at least one auxiliary flow device located downstream of the engine, and a computing system operable to determine an estimated value corresponding to a flow of fluid through the compressor. The estimated value takes into account flow from the compressor to the at least one auxiliary flow device distinct from a flow of fluid from the compressor toward the engine.

In another aspect, the present disclosure is directed to a method for monitoring boost leak in an internal combustion engine system. The method includes providing a first flow of fluid from a compressor toward at least one auxiliary flow device, providing a second flow of fluid from the compressor toward an engine of the internal combustion engine system, and determining an estimated value corresponding to a flow of fluid through the compressor. The second flow of fluid is distinct from the first flow of fluid and the estimated value is determined as a function of the first flow of fluid from the compressor toward the at least one auxiliary flow device.

DETAILED DESCRIPTION

Figure 1:
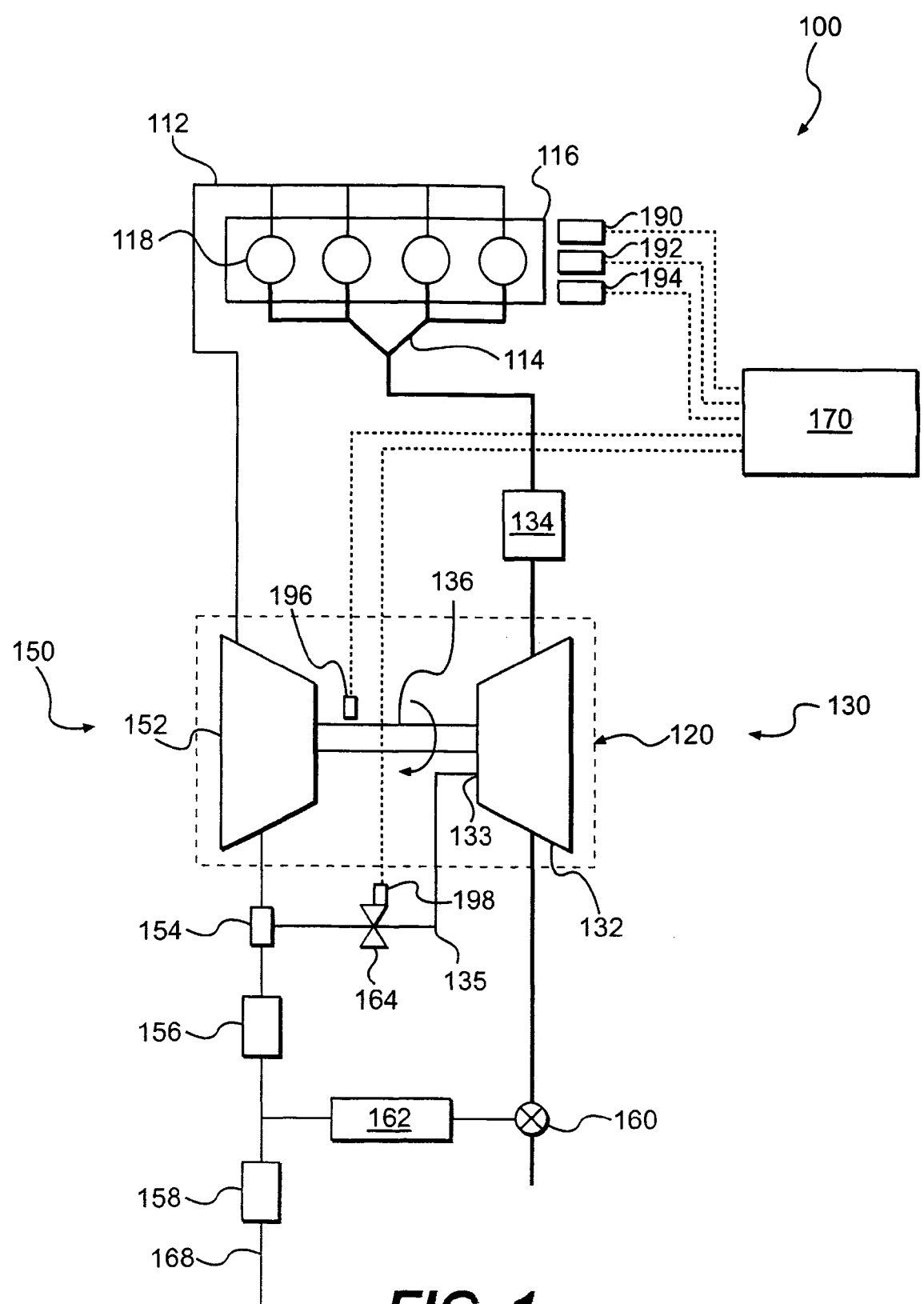
FIG. 1 is a schematic representation of an exemplary engine and system of the present disclosure.

With reference to FIG. 1, there is shown a schematic of an exemplary internal combustion engine system 100 having an engine 116, exhaust system 150, intake system 130, turbocharger system 120, and engine control module (ECM) 170. The engine 116 may include a plurality of engine cylinders 118. Engine 116 may be any type of internal combustion engine such as a diesel engine, a gasoline engine, a gaseous fuel driven engine, or any other type of engine known in the art.

Intake system 130 may include compressor 132, aftercooler 134, and intake manifold 114. Compressor 132 may be configured to compress the air flowing into engine 116 to a predetermined pressure when compressor 132 operates. The compressor 132 includes a compressor wheel (not shown) and is carried by the turbocharger shaft 136. Compressor 132 may include a fixed geometry type compressor, a variable geometry type compressor, or any other type of compressor known in the art. It is contemplated that more than one compressor 132 may be included and disposed in parallel or in series relationship.

Aftercooler 134 may be fluidly connected to compressor 132 and intake manifold 114. Aftercooler 134 may be configured to extract heat from the air provided by compressor 132 to lower the intake manifold temperature and increase the air density of the air provided to the intake manifold 114. Aftercooler 134 may use techniques such as jacket water, air to air, and the like.

Intake manifold 114 may be fluidly connected to aftercooler 134. Intake manifold 114 may be configured to provide fluid to the engine cylinders 118. The fluid may be, for example, air, and air and engine exhaust mix, or a fuel and air mixture, and the terms are used interchangeably herein.

Exhaust system 150 may include an exhaust manifold 112, turbine 152, auxiliary flow device 154, particulate matter filter 156, mixing valve 160, flow cooler 162, catalyst 158, and exhaust line 168. Exhaust manifold 112 may be configured to convey exhaust gases from the engine 116 to the turbine 152.

Turbine 152 may include a turbine wheel carried by turbocharger shaft 136 which, in turn, may be rotatably carried by a housing, for example, a single-part or multi-part housing. Turbine 152 may be a fixed geometry type, a variable geometry type, or any other type of turbine known in the art. The fluid flow path from the exhaust manifold 112 to the turbine 152 may include a variable nozzle (not shown) or other variable geometry arrangement adapted to control the velocity of exhaust fluid impinging on the turbine wheel.

Auxiliary flow device 154 may be an auxiliary circuit or component that may be selectively and fluidly connected to turbine 152 via a fluid passageway to receive exhaust gases from the turbine 152. Auxiliary flow device 154 may also be fluidly connected to an outlet 133 of compressor 132 via an auxiliary flow line 135 in order to allow a small amount of the compressed and heated air to be bled off from the compressor 132 and be diverted to the auxiliary flow device 154. A flow control device 164 may be connected to the auxiliary flow line 135 to control the amount of fluid, such as air or an air/exhaust mixture, passed to auxiliary flow device 154 from the compressor 132. The flow control device 164 may be of any type well known in the art, such as a fixed or variable venturi or throttle. Flow control device 164 may be configured to constrict the flow of fluid through auxiliary flow line 135, thereby increasing a speed of the fluid passing through flow control device 164 and, in turn, reducing a pressure of the flow of fluid through the constriction.

Auxiliary flow device 154 may be any type of device, circuit, component or the like which may be fluidly connected to compressor 132 and may be configured to receive compressed fluid from the compressor 132. In the disclosed embodiment, auxiliary flow device 154 is a regeneration device; however, this is meant to be exemplary only and not limiting as other types of auxiliary circuits, components, devices, or the like may be considered to be within the scope of the present disclosure. Other examples of auxiliary flow devices may include intercoolers, after-treatment devices, burners, pumps, and the like. In the disclosed embodiment, auxiliary flow device is only a single device; however, this is meant to be exemplary only so as not to obscure the details of the disclosure. Auxiliary flow device 154 may be one or more devices connected to compressor 132. The one or more auxiliary flow devices 154 may be situated in series, parallel, or any other suitable configuration.

Particulate matter filter 156 may be selectively and fluidly connected to auxiliary flow device 154. In addition, particulate matter filter 156 may be selectively and fluidly connected to flow cooler 162. Exhaust gases that exit particulate matter filter 156 and which are not extracted and sent to flow cooler 162 may proceed to catalyst 158 and on to exhaust line 168. As shown, the exhaust gases of the exhaust gas recirculation system are extracted downstream of the particulate matter filter 156. However, it should be appreciated that the exhaust gases may be extracted from anywhere in the exhaust system 150, such as upstream of the particulate matter filter 156, upstream of the turbocharger 152, or from the exhaust manifold 112.

As noted above, flow cooler 162 may be selectively and fluidly connected to the particulate matter filter 156 to allow portions of the exhaust gases to be supplied to the compressor 132 of intake system 130 by means of mixing valve 160. As is well known, the flow cooler 162 may include an air to gas cooler, a water to gas cooler, or an oil to gas cooler properly sized to provide the necessary cooling.

Turbocharger system 120 may include compressor 132 and turbine 152 connected by turbocharger shaft 136, as disclosed hereinabove. The illustrated turbocharger system 120 is comprised of a single turbocharger. However, the turbocharger system may include a first and second turbocharger each having a compressor and a turbine arranged in series with one another. Alternatively, the turbocharger system 120 may be replaced with a supercharger system where the compressor 132 may be driven by an electric motor or other device.

The operations of internal combustion engine system 100 may be governed by a computing system where the computing system may include one or more devices such as, for example, engine control module (ECM) 170. The ECM 170 may include a plurality of hardware components and software routines to receive the information from various physical sensors located throughout the engine 116, intake system 130, exhaust system 150, and turbocharger system 120. The ECM 170 may be capable of passing this information through engine control algorithms which may be stored in a memory region (not shown) of ECM 170 as software routines. While the computing device is shown as an engine control module (ECM) 170, it will be appreciated that the computing device may be any type of device operable to receive, process, and transmit data, signals, or signals corresponding to data. Further, while data, signals, and signals corresponding to data have been disclosed, it is envisioned that any method by which a value may be communicated to the computing device may be used.

Engine operations may be governed by the ECM 170 in response to one or more measured, sensed, calculated, and/or predetermined engine operating parameters, which are typically inputs to the ECM 170, but also may be stored in tables, maps, or other data structures. The measured or sensed operating parameters may be provided by physical sensors and may be provided as data, signals, or signals corresponding to data. Some physical sensors may include an intake manifold temperature sensor 194, an intake manifold pressure sensor 192, an engine speed sensor 190, an auxiliary flow line sensor 198, and a turbo speed sensor 196 located on or near the turbocharger shaft 136. Other sensors (not shown) may include, for example: inlet ambient temperature, fuel quantity, oil pressure, oil temperature, exhaust temperature, barometric pressure, compressor outlet temperature, turbine inlet temperature, and turbine inlet pressure, and the like. The sensors can be of a variety of designs known in the art. Further, while the illustration discloses the sensors physically connected to the ECM 170, there are numerous examples of sensors that may be able to send data and other signals wirelessly and/or remotely.

In addition to the physical sensors, the system of the present disclosure may include a plurality of virtual sensors. Virtual sensors may be software routines that utilize the measurements from existing physical sensors in the system and then apply one or more algorithms to determine a given value associated with an engine component that does not have a physical sensor. Virtual sensors may also be tables, maps, or other data structures that are accessed based upon particular characteristics of the engine 116, intake system 130, exhaust system 150, and turbocharger system 120. Virtual sensors may provide values as data, signals, or signals corresponding to data.

For example, a plurality of relationship maps may be stored in the memory of ECM 170. Each of these maps may include a collection of data in the form of tables, graphs, and/or equations. For example, an exhaust differential pressure value and an exhaust gas density value may form the coordinate axis of a 3-D map used for determining a Recirculation Mass Air Flow (RMAF) value. In another example, the sensed atmospheric pressure value, the mixing valve position, and a calculated total mass air flow (TMAF) value may form the coordinate axis of a 4-D map used for determining a compressor inlet pressure. In yet another example, a corrected TMAF value and a sensed intake manifold air pressure value may form the coordinate axis of a 3-D map used for determining a compressor outlet pressure. In an additional example, a calculated compressor pressure ratio value, a sensed turbo speed value, and the corrected TMAF value may form the coordinate axis of a 4-D map used for determining a compressor efficiency. It is contemplated that additional and/or different maps could be stored within ECM 170, if desired.

ECM 170 may use the physical and virtual sensor values, or values determined from such sensor values, to monitor boost pressure and determine a boost leak by taking into account the amount of compressed fluid flow to auxiliary components, circuits, devices, or the like. In the exemplary embodiment, ECM 170 may take into account the amount of flow through the auxiliary flow line 135 that connects the compressor 132 and the auxiliary flow device 154. This allows for the accurate determination of one or more flow and/or boost values through all the components of engine 116, exhaust system 150, intake system 130, and turbocharger system 120.

ECM 170 may compare the physical and virtual sensor values with a threshold value or range of values. Any deviation beyond the threshold value or outside a range of values may be indicative of a system problem. If one or more values exceeds the threshold value or are outside a range of values, the ECM 170 may generate a response. Examples of responses may include an error signal, alert signal, diagnostic signal, warning, engine shutoff, engine bypass, and the like. The continued, uninterrupted operation of the engine may also be an acceptable response.

INDUSTRIAL APPLICABILITY

The present apparatus and method may be used in any combustion-type system such as an engine, a furnace, a generator, or any other system known in the art where monitoring boost pressure and detecting a boost leak may be advantageous. The present apparatus and method provide for the monitoring of boost pressure and the diagnosis of a boost leak by taking into account the engine 116, intake system 130, exhaust system 150, and turbocharger system 120. In particular, the present method and apparatus take into account auxiliary engine devices and components that may receive a portion of the compressed fluid from the compressor 132 of the turbocharger system 120. Examples of such auxiliary engine components may include after-treatment devices, regeneration or burner devices, auxiliary coolers, and the like. Auxiliary engine components may be located upstream or downstream of engine 116. In this manner, the present apparatus and method is adapted to provide accurate monitoring and diagnostic capabilities, and furthermore, may be able to detect failures before the operator feels or senses any significant performance loss or damage. The operation of the system and method for monitoring boost and detecting a boost leak will now be explained.

Figure 2:
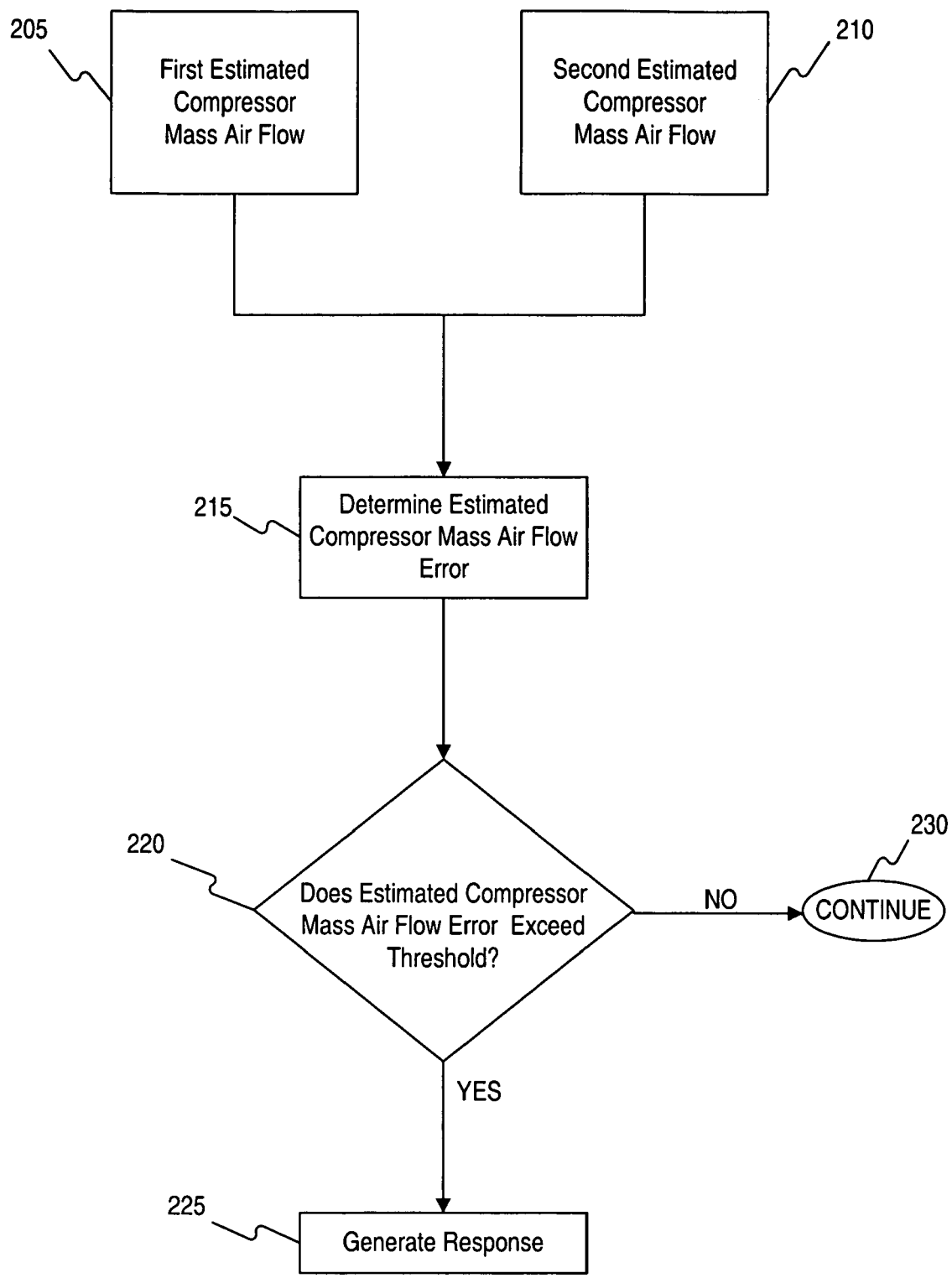
FIG. 2 is a flow chart illustrating an exemplary embodiment of the operation of the boost leak detection system of the present disclosure.

Referring to FIG. 2, there is shown a flow chart of the steps of the method. As shown in step 205, which will be explained in more detail with reference to FIG. 3, a first estimated compressor mass air flow is determined. In step 210, which will be explained in more detail with reference to FIG. 4, a second estimated compressor mass air flow is determined. Although steps 205 and 210 are shown in parallel, there is no requirement that they be done in any particular order. As used herein, the terms first and second, when used with respect to first estimated compressor mass air flow and second estimated compressor mass air flow, are intended only to uniquely identify the two estimated compressor mass air flows and are not intended to imply any numerical order or preference. The first and second estimated compressor mass air flows may be absolute values or they may be values corresponding to the absolute values of the first and second estimated compressor mass air flows.

In step 215, an estimated compressor mass air flow error is determined by subtracting the second estimated compressor mass air flow from the first estimated compressor mass air flow. Alternatively, the first estimated compressor mass air flow may be subtracted from the second estimated compressor mass air flow to determine an estimated compressor mass air flow error. The estimated compressor mass air flow error is a calculated estimation of the amount of boost pressure lost in the engine 116, intake system 130, exhaust system 150, and turbocharger system 120.

In step 220, the estimated compressor mass air flow error is evaluated against a threshold value or range of values. These values may be predetermined or they may be calculated dynamically. If the compressor mass air flow error does not exceed the predetermined value or is within a range of values, processing will continue, as in step 230. Continued processing may include a return to steps 205 and 210.

If the estimated compressor mass air flow error exceeds the predetermined value or is outside a range of values, the ECM 170 may determine that there is a boost leak and may generate a response, as in step 225. In addition to generating a response, software within the ECM 170 may also begin a diagnostic routine or may take active steps to correct the condition or minimize the effects of a boost leak on the system. For example, in a system in which the first estimated compressor mass air flow is value X and the second estimated compressor mass air flow is value Y, the difference between the two values is error value Z. This difference is referred to herein as the estimated compressor mass air flow error. If the error value Z is greater than the threshold value, value A, then a response will be generated, such as an alert signal. Alternatively, the threshold may be a range of values such that, if error value Z falls between a threshold range defined by values B and C, then a first type of alert may be signaled, whereas if the result is greater than value C, a second type of alert may be signaled, and if the result is less than value B, there may be no alert or response.

Figure 3:
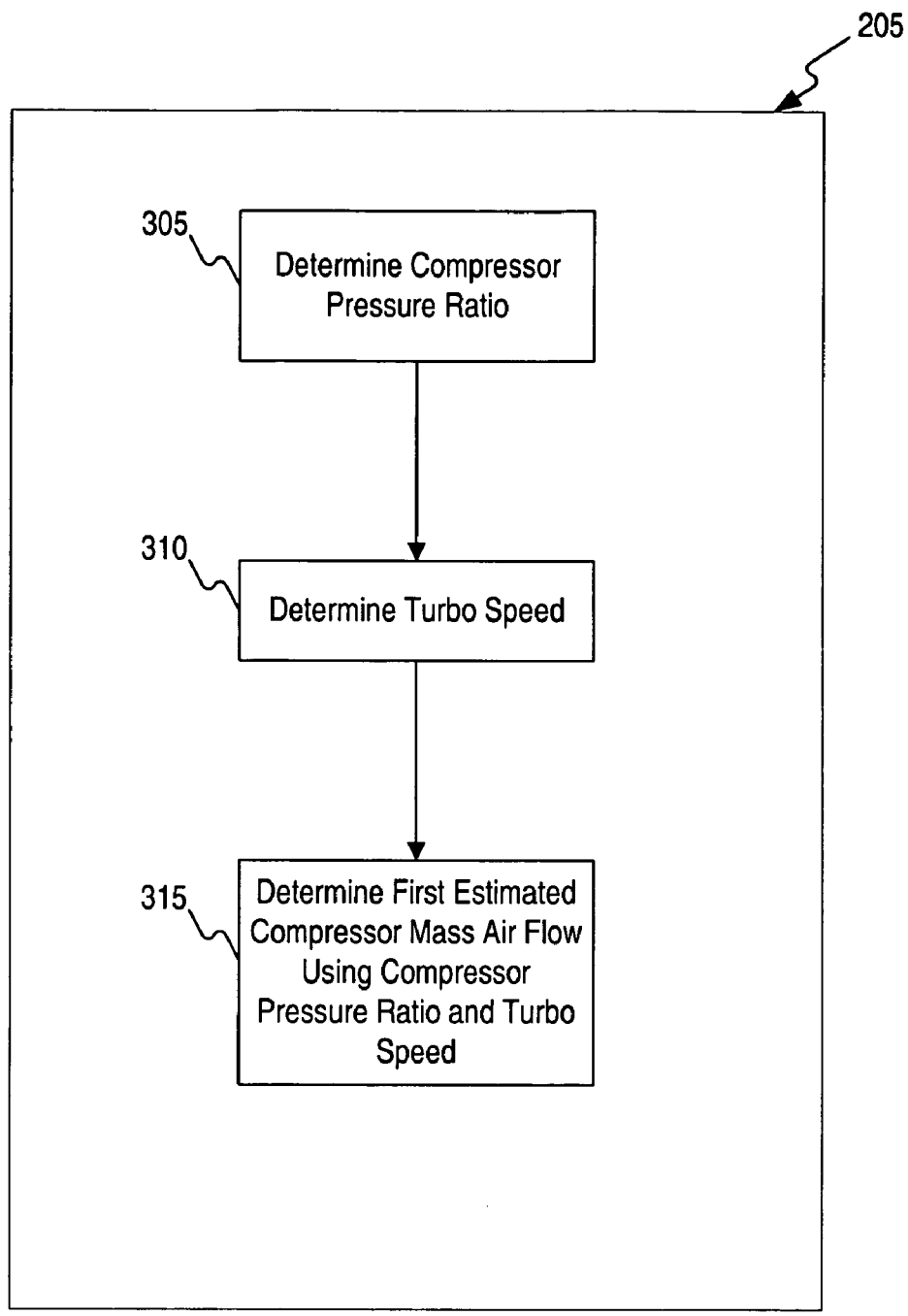
FIG. 3 is a flow chart illustrating an exemplary embodiment of the determination of the first estimated compressor mass air flow of the present disclosure.

Referring now to FIG. 3, there is shown a flow chart of the steps for determining a first estimated compressor mass air flow, as referenced in step 205 of FIG. 2. In step 305, a compressor pressure ratio, $P_r$, may be determined as a function of compressor outlet pressure divided by compressor inlet pressure. Virtual sensors may be used to determine both the compressor inlet pressure, represented by $P_{Comp\_In}$, and the compressor outlet pressure, represented by $P_{Comp\_Out}$.

To calculate the compressor pressure ratio, $P_r$, ECM 170 may receive inputs from various sensors including the turbo speed sensor 196, engine speed sensor 190, intake manifold pressure sensor 192, intake manifold temperature sensor 194, and auxiliary flow line sensor 198. ECM 170 may also receive inputs from other sensors (not shown), such as, sensors indicating an engine valve opening duration, an atmospheric pressure, a mixing valve position, an exhaust gas recirculation differential pressure, an exhaust gas temperature, and an exhaust gas pressure.

In response to the received inputs, ECM 170 may determine a density of the exhaust gas directed to compressor 132. The density of the exhaust gas may be determined either before or after flow cooler 162. Specifically, ECM 170 may use Eq. 1 below to calculate the exhaust gas density as a function of the exhaust gas pressure and temperature values.

$$\rho_{Exh} = \frac{P_{Exh}}{R*(T_{Exh}+273.15)} \qquad \text{Eq. 1}$$

wherein:
$\rho_{Exh}$ is the Density of the Exhaust;
R is the Universal Gas Constant (0.2872);
$P_{Exh}$ is the Pressure of the Exhaust; and
$T_{Exh}$ is the Temperature of the Exhaust (Celsius).

ECM 170 may then reference one of the 3-D maps stored within the memory thereof to determine the recirculation mass air flow (RMAF), the RMAF corresponding to the mass air flow through the flow cooler 162. In particular, ECM 170 may compare an exhaust gas recirculation differential pressure value and the exhaust gas density value calculated from Eq. 1 above to determine the RMAF value.

ECM 170 may also estimate the total mass air flow (TMAF) where the TMAF corresponds to the mass air flow through the engine. Specifically, as described in Eq. 2 below, TMAF may be calculated as a function of an intake valve opening duration value, engine speed obtained from engine speed sensor 190, and the ratio of the intake manifold pressure value to the intake manifold temperature value received via intake manifold pressure sensor 192 and intake manifold temperature sensor 194, respectively.

$$TMAF = Duration_{IV}^{A} \times \left[(B \times RPM_{Engine}) \times \frac{IMAP^{C}}{IMAT^{D}}\right] \qquad \text{Eq. 2}$$

wherein:
TMAF is the Total Mass Air Flow;
$Duration_{IV}$ is an Opening Duration of an intake valve;
$RPM_{Engine}$ is the rotational speed of engine 116;
IMAP is sensed Intake Manifold Air Pressure;
IMAT is sensed Intake Manifold Air Temperature; and
A, B, C, and D are variables determined through analysis and/or operational testing.

Once TMAF and RMAF have been calculated, a Fresh Mass Air Flow (FMAF) value may be calculated. FMAF may be calculated as the difference between TMAF and RMAF according to Eq. 3 below. FMAF may correspond to a mass air flow to the compressor from sources other than the flow cooler 162.

$$FMAF = TMAF - RMAF \qquad \text{Eq. 3}$$

wherein:
FMAF is the Fresh Mass Air Flow;
TAMF is the Total Mass Air Flow; and
RAMF is the Recirculation Mass Air Flow.

Following the calculation of the FMAF value, a compressor inlet temperature may be determined. In particular, compressor inlet temperature may be calculated according to Eq. 4 below where the temperature of the RMAF and the temperature of the FMAF may be obtained by means of physical sensors (not shown). In some embodiments it may be assumed that the specific heat of the FMAF and the specific heat of the RMAF are equal to 1.

$$T_{Comp\_In} = \frac{(FMAF \times T_{FMAF} \times cp_{FMAF}) + (RMAF \times T_{RMAF} \times cp_{RMAF})}{(FMAF \times cp_{FMAF}) + (RMAF \times cp_{RMAF})} \qquad \text{Eq. 4}$$

wherein:
$T_{Comp\_In}$ is the Compressor Inlet Temperature;
FAMF is the Fresh Mass Air Flow;
$T_{FMAF}$ is the Temperature of the FMAF;
$cp_{FMAF}$ is the Specific Heat of the FMAF;
RMAF is the Recirculated Mass Air Flow;
$T_{RMAF}$ is the Temperature of the RMAF; and
$cp_{RMAF}$ is the Specific Heat of the RMAF.

Also following the calculation of the TMAF value, a compressor inlet pressure may be determined. In particular, ECM 170 may reference one of the 4-D maps stored within the memory thereof and compare the atmospheric pressure value, the TMAF value, and the mixing valve position to determine the compressor inlet pressure value. It is contemplated that compressor inlet pressure may alternatively or additionally be determined based on the density of the air flowing through compressor 132, if desired. Atmospheric air density may be estimated based on FMAF, atmospheric pressure, mixing valve position, and TMAF.

Once the compressor inlet pressure value has been determined, the TMAF value may be corrected to standard conditions according to Eq. 5 below where the compressor inlet temperature may be obtained by means of a physical sensor (not shown).

$$TMAF_{corr} = TMAF \times \frac{\sqrt{\frac{T_{Comp\_In}}{T_{STD}}}}{\frac{P_{Comp\_In}}{P_{STD}}} \qquad \text{Eq. 5}$$

wherein:
$TMAF_{corr}$ is the Corrected Total Mass Air Flow;
TMAF is the Total Mass Air Flow;
$T_{Comp\_In}$ is the Compressor Inlet Temperature;
$T_{STD}$ is the Standard Air Temperature (25° C.);
$P_{Com\_In}$ is the Compressor Inlet Pressure; and
$P_{STD}$ is the Standard Air Pressure (101.325 kPa).

ECM 170 may determine the compressor outlet pressure according to Eq. 6 below where the intake manifold pressure is determined by means of intake manifold pressure sensor 192. The ECM 170 may reference a 2-D map stored within the memory thereof to determine a pressure offset using TMAF. Alternatively, ECM 170 may reference a 3-D map using TMAF and engine speed to determine a pressure offset. The pressure offset corrects for pressure losses between the compressor 132 and the intake manifold 114.

$$P_{Comp\_out} = IMAP + P_{Offset} \qquad \text{Eq. 6}$$

wherein:
$P_{Comp\_out}$ is the Compressor Outlet Pressure;
IMAP is sensed Intake Manifold Air Pressure; and
$P_{offset}$ is the Pressure Offset using a virtual sensor.

Finally, ECM 170 may determine the pressure ratio of fluid entering compressor 132 to the fluid exiting compressor 132. That is, ECM 170 may calculate the pressure ratio according to Eq. 7 below.

$$P_r = \frac{P_{Comp\_out}}{P_{Comp\_in}} \qquad \text{Eq. 7}$$

wherein:
$P_r$ is the Pressure Ratio;
$P_{Comp\_out}$ is the Compressor Outlet Pressure; and
$P_{Comp\_In}$ is the Compressor Inlet Pressure.

Once the compressor pressure ratio has been determined, the turbo speed is determined at step 310 using a turbo speed sensor 196 located on turbocharger shaft 136, as shown in FIG. 1. Using the values determined for the compressor pressure ratio and turbo speed, the first estimated compressor mass air flow is determined at step 315. The determination of the first estimated compressor mass air flow may be made by accessing one or more maps using the turbo speed and compressor pressure ratio values.

Figure 4:
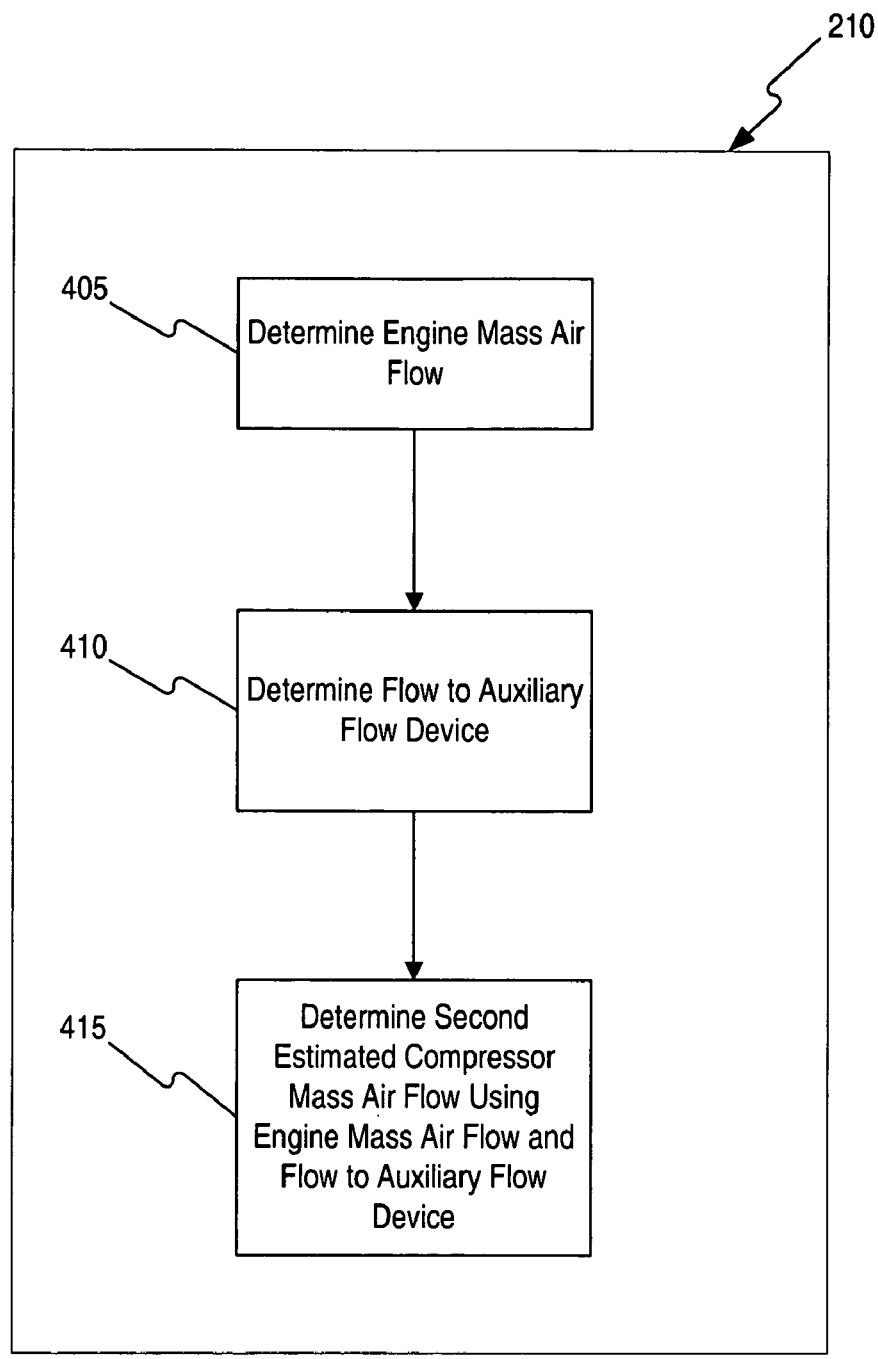
FIG. 4 is a flow chart illustrating an exemplary embodiment of the determination of the second estimated compressor mass air flow of the present disclosure.

Referring now to FIG. 4, there is shown a detailed flow chart of the steps for determining a second estimated compressor mass air flow, as referenced in step 210 of FIG. 2. At step 405, the total mass air flow through the engine (TMAF) is determined. As shown in Eq. 2 above, the TMAF may be determined with a polynomial equation using data provided by the intake manifold pressure sensor 192, engine speed sensor 190, intake manifold temperature sensor 194, and constants that are empirically driven based upon the specific engine type. Alternatively, the equation may be replaced with a map or data table and table look-up approach, in which the data table and/or map emulates the particular polynomial relationships.

At step 410, the amount of compressed fluid flowing to an auxiliary component may be determined by means of the auxiliary flow line sensor 198. In the exemplary embodiment, the auxiliary flow line sensor 198 measures the mass air flow of compressed fluid which is bled off from the compressor 132 and sent to the auxiliary flow device 154.

At step 415, the engine mass air flow is combined with the mass air flow to the auxiliary flow device 154 as determined by the auxiliary flow line sensor 198. The combination may be addition of the actual values, addition of weighted values, or the like. While the exemplary embodiment discloses the second estimated compressor mass air flow determined in response to the flow of fluid to a single auxiliary flow device, the calculations may be similarly used to determine the second estimated compressor mass air flow in response to the flow of fluid to more than one auxiliary flow device 154.

Referring again to step 220 of FIG. 2, the difference between the first estimated compressor mass air flow and the second estimated compressor mass air flow is determined and this difference is referred to as the estimated compressor mass air flow error. As noted above, if the estimated compressor mass air flow error exceeds a predetermined value or is outside of a range of values, one or more responses may be generated. In this manner, the present apparatus and method are adapted to provide onboard diagnostic capabilities and, furthermore, may be able to detect failures before the operator feels or senses any significant performance loss or damage.

While certain exemplary methods have been disclosed to determine an error value, it is envisioned that other methods may also be used to determine the error value using physical and virtual sensors. For example, while certain combinations of virtual and physical sensors are shown in the disclosed embodiment, it is envisioned that other variations of the same or other physical and virtual sensors and their combinations may be used interchangeably to determine the desired values.

It will be apparent to those skilled in the art that various modifications and variations can be made in the disclosed boost leak monitoring system without departing from the scope of the invention. Other embodiments of the invention will be apparent to those skilled in the art from consideration of the specification and practice of the invention disclosed herein. It is further envisioned that the disclosed embodiment could be achieved using entirely physical sensors or entirely virtual sensors. Therefore, it is intended that the specification and examples be considered as exemplary only, with a true scope of the invention being indicated by the following claims and their equivalents.

What is claimed is:

1. A method for monitoring boost leak in an internal combustion engine system, comprising:
   providing a first flow of fluid from a compressor toward at least one auxiliary flow device;
   providing a second flow of fluid from the compressor toward an engine of the internal combustion engine system, the second flow of fluid distinct from the first flow of fluid; and
   determining an estimated value corresponding to a flow of fluid through the compressor, the estimated value being determined as a function of the first flow of fluid from the compressor toward the at least one auxiliary flow device.

2. The method as in claim 1, wherein the estimated value is a first estimated value and the method further includes:
   determining a second estimated value corresponding to the flow of fluid through the compressor of the internal combustion engine system.

3. The method as in claim 2, wherein the compressor is a compressor of a turbocharger, and the second estimated value is a function of a compressor pressure ratio and a turbo speed of the turbocharger.

4. The method as in claim 2, further including:
   determining an error value based on the first estimated value and the second estimated value.

5. The method as in claim 4, further including:
   evaluating the error value against a threshold.

6. The method as in claim 5, further including:
   generating a response based on the evaluation of the error value against the threshold.

7. The method as in claim 1, wherein the at least one auxiliary flow device is located downstream of the engine.

8. The method as in claim 1, wherein the at least one auxiliary flow device includes a burner of an exhaust system of the internal combustion engine system.

9. An internal combustion engine system, comprising:
   an engine;
   a compressor located upstream of the engine;
   at least one auxiliary flow device located downstream of the engine; and
   a computing system operable to determine an estimated value corresponding to a flow of fluid through the compressor, the estimated value being determined as a function of a flow of fluid from the compressor toward the at least one auxiliary flow device distinct from a flow of fluid from the compressor toward the engine.

10. The system of claim 9, wherein the estimated value is a first estimated value, and the computing system is further operable to determine a second estimated value corresponding to the flow of fluid through the compressor.

11. The system of claim 10, wherein the computing system is operable to determine an error value based on the first estimated value and the second estimated value.

12. The system of claim 11, wherein the computing system generates a response based on the evaluation of the error value against a threshold.

13. The system of claim 10, wherein the compressor is a compressor of a turbocharger and the second estimated value is a function of a compressor pressure ratio and a turbo speed of the turbocharger.

14. The system of claim 9, wherein the at least one auxiliary flow device includes a burner of an exhaust system of the internal combustion engine system.

15. A method for monitoring boost leak in an internal combustion engine system, comprising:
   providing compressed fluid from a compressor to at least one first device;
   providing compressed fluid from the compressor to at least one second device, the at least one second device being different from the at least one first device;
   generating a response indicating a boost leak, wherein whether or not a response is generated is a function of an amount of compressed fluid provided to the at least one second device.

16. The method as in claim 15, wherein the at least one first device includes an engine.

17. The method as in claim 16, wherein the at least one second device includes a burner located downstream of the at least one first device.

18. The method as in claim 16, wherein the amount of compressed fluid provided from the compressor to the at least one second device is based on data provided by a flow sensor located between the compressor and the at least one second device.

19. A system for monitoring boost leak in a compressor system, comprising:
   a first device;
   a compressor located upstream of the first device;
   at least one second device located downstream of the first device; and
   a computing system operable to determine an estimated value corresponding to a flow of fluid through the compressor, the estimated value being determined as a function of a flow of fluid from the compressor toward the at least one second device distinct from a flow of fluid from the compressor toward the first device.

20. The system of claim 19, wherein the estimated value is a first estimated value, and the computing system is further operable to determine a second estimated value corresponding to a flow of fluid through the compressor.

21. The system of claim 20, further including:
   determining an error value based on the first estimated value and the second estimated value;
   evaluating the error value against a threshold; and
   generating a response based on the evaluation of the error value against the threshold.

\* \* \* \* \*